Nov. 24, 1931.　　　B. M. BATTEY　　　1,833,015
TIMING DEVICE FOR TALKING MOTION PICTURES AND THE LIKE
Filed Oct. 31, 1923
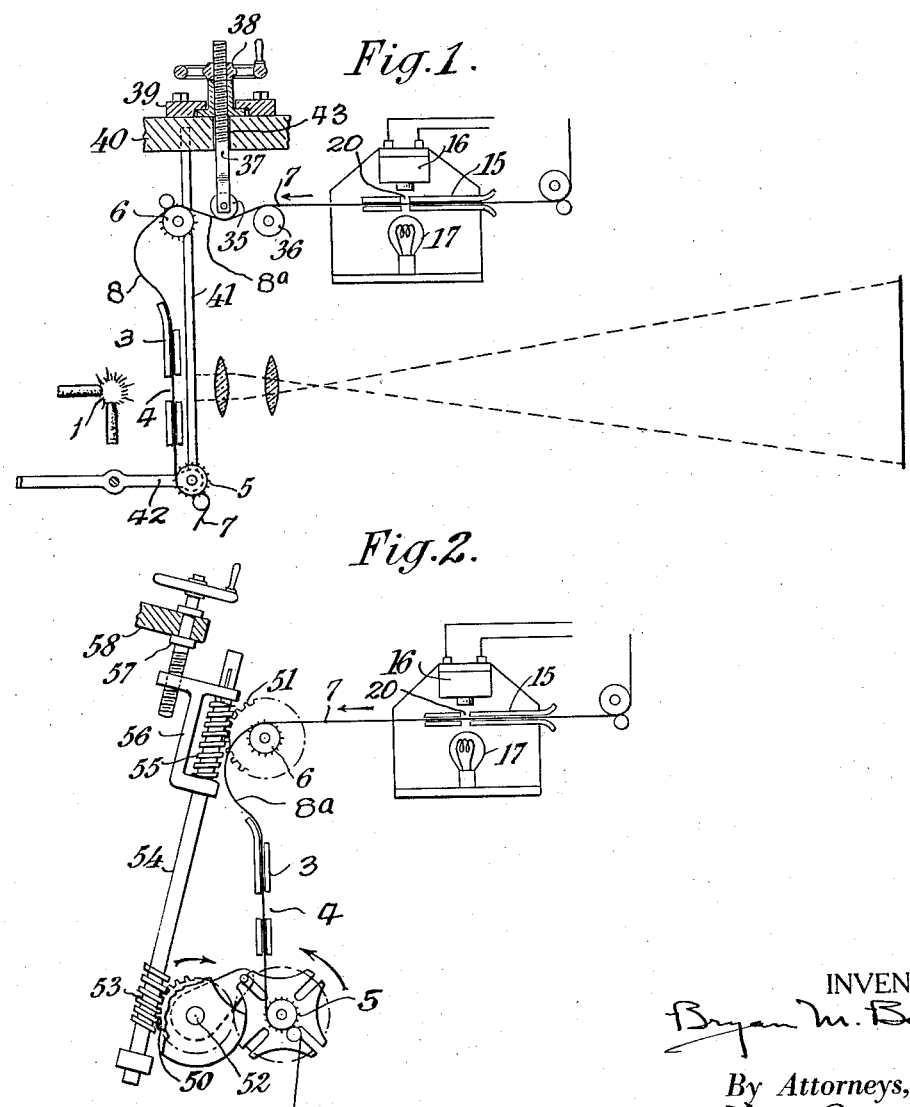

Patented Nov. 24, 1931

1,833,015

UNITED STATES PATENT OFFICE

BRYAN M. BATTEY, OF NEW YORK, N. Y.

TIMING DEVICE FOR TALKING MOTION PICTURES AND THE LIKE

Application filed October 31, 1923. Serial No. 671,995.

This invention relates to timing devices for motion picture apparatus, and has for its object the elimination of time errors, commonly occurring in the operation of such devices.

The synchronous running of a sound record and a motion picture film may be accomplished in several ways as is well understood. To produce a true illusion of the natural association of sound and visual impressions in the exhibition of a talking motion picture, however, the inventor has found it necessary to introduce certain time corrections to compensate for the difference in speed of travel of light and electrical impulses as compared with sound impulses. It is known that a light or electrical impulse starting at the same point simultaneously with a sound impulse will reach a remote point at different times, the time discrepancy in the arrival of such impulses being a function of the distance travelled. For example, a sound reproducing device located adjacent to a motion picture screen and producing simultaneously with the exhibition of a given photographic image the appropriate corresponding sound, will actually appear to be one-fifth of a second out of synchronism therewith at an observing point 200 feet distant. Practical experience in the field of talking motion pictures teaches that the permissible error consistent with a satisfactory natural illusion must not exceed one-twentieth part of a second. In the example cited there is obviously four times the permissible time error at the observer's station.

It is, of course, not possible to project sound and light through the air to observers at different ranges so that each observer may receive the corresponding sound and light impressions in perfect synchrony. It is, however, a very material advantage to adjust the sound and light image projecting devices in such a manner that at the mean range of a group of observers the corresponding light and sound impressions will be in perfect accord. By this adjustment the average error at any point in the audience is less than can be obtained in any other way. For example, in a theatre 100 feet deep, if the corresponding sound and light images be launched from the screen one-twentieth of a second apart they will pass the observers at the front of the theatre one-twentieth of a second out of step, which is consistent with a satisfactory illusion; they will pass an observer halfway to the rear in perfect unison and they will reach an observer at the rear of the theatre with an error not exceeding one-twentieth of a second, the error being of opposite sign to that observed at the front of the theatre. The rule as to permissible time error is not, however, effected by a change of sign. If the sound and light images be launched from the screen at the same time the results will not be satisfactory. The impulses will pass an observer at the front of the theatre in perfect synchrony, an observer at the mid-range one-twentieth of a second out of step and will reach an observer at the rear of the theatre with one-tenth of a second time error, which error, as already stated, is more than is consistent with a good illusion of the natural association of sound and light images. In this latter case the entire rear half of the audience is receiving a more or less impaired illusion.

In the following more detailed description of the invention reference is had to the accompanying figures, in which:

Figure 1 shows a preferred embodiment of the invention as applied to a talking motion picture device employing a single film on which both the picture and sound images are recorded.

Figure 2 shows diagrammatically a modified form of the invention as applied to the system shown in Figure 1.

Referring to Figure 1, there is shown a standard motion picture projector mechanism comprising essentially a source of illumination 1, a lens system 2, film gate 3, projection aperture 4, intermittent sprocket 5, continuous feed sprocket 6 and motion picture film 7.

The film has a slack loop 8 between the upper continuous feed sprocket and the gate to permit of the intermittent action of the film after it leaves said sprocket. The sound reproducing device associated with the motion picture device is of the type adapted to reproduce sound from a corresponding light record through the agency of a photo-electric cell, and consists of a record strip guide 15, a photo-electric cell 16, a source of illumination 17, and light aperture 20. The film or record strip may be advanced by any suitable mechanism whereby it is moved through the sound pick-up device at a substantially uniform rate of speed, and through the picture projecting mechanism in the usual intermittent or step by step manner. In the embodiment illustrated, the continuous feed sprocket 6 of the picture projecting apparatus is utilized to draw the record strip at a uniform rate of speed through the sound pick-up mechanism 15, 16, 17. The composite motion picture strip 8 carrying both pictorial and sound recordings, is carried through the record strip guide, past the light aperture, where its varying marginal images are impressed upon the photo-electric cell, and by this means causes a fluctuating current in the electrical circuit of such cell, corresponding to the sound waves which produced the record.

In such composite strips, the portion of the sound record corresponding to a given picture must obviously be displaced from said picture a sufficient distance along the strip to permit the simultaneous registration of the corresponding sound and picture images with their respective apertures. The apparatus illustrated requires that the portion of the sound record corresponding to a given picture be set back along the strip approximately one foot.

An idle roller 35 acts on a portion of the film between the continuous feed sprocket 6 of the projector and a second idle roller 36 which is employed to guide the film from the reproducer gate 15. Idle roller 35 is adjustably carried by a forked member 37, which slides vertically in a square bore 43 of guide block 40 and at its upper end is threaded to screw into a hand wheel nut 38. The portion of member 37 which slides freely through squared bore 43 is preferably of generally square cross-section so that it cannot turn within said bore, the threads which are cut on said member being formed principally in the edges of the squared section. Any other suitable means may be employed to prevent rotation of the threaded rod or member 37 relative to guide block 40 while permitting free sliding movement therethrough. The bore 43 need not be square as the rod 37 could be slidably guided by the usual key and keyway construction in a round bore, the keyway being cut in the threaded portion of the rod so as to permit free sliding motion of such portion through the guide block. Said nut is held against longitudinal displacement by a collar 39 fastened to guide block 40.

An adjustable loop 8ª is thus provided in the film, the length of said loop being controlled by the setting of idle roller 35. It will be apparent that a downward adjustment of idle roller 35 will cause the film or record strip 7 to be drawn to the left through the sound pick-up device, the strip being freely movable therethrough while being in positive engagement to the left of the said idle roller with the continuous feed sprocket 6. If the projector is running, the result will be to cause the film to travel further through the sound pick-up than through the picture projection aperture 4. This results in altering the relative timing of reproduction of corresponding sound and picture events, the effect being to cause the sound to be reproduced earlier than the projection of its corresponding pictorial image. It will be clear that an upward movement of guide roller 35 will have just the reverse effect up to the point where the controlled slack in adjustable loop 8ª is exhausted. Any free or uncontrolled slack in this loop beyond that required to pass around the loop adjusting guide roller 35 will always be taken out by the continuous rotation of sprocket 6, the film to the left being held against any accidental displacement by the usual light friction afforded in the sound reproducing gate or guide 15.

At the usual rate of travel of sound films, the range of adjustment provided by a four inch vertical displacement of loop-adjusting roller 35 would result in changing the relative timing or time bias, as it may be termed, between the corresponding picture and sound images, as much as one-half a second. Such a range of adjustment is more than ample to compensate for any difference in time required for the perception of sound and visual effects at any practicable distance from the motion picture screen. Nevertheless, any desired range of adjustment may be provided to compensate for abnormal conditions that may arise through the improper spacing of corresponding sound and picture images on the composite film. Such improper spacing does occur at times through accidental relative displacement of the sound and picture negatives when printing the positive film.

Guide block 40 is susceptible of a movement parallel to the movement of idle roller 35 and its supporting member 37, and is suitably mounted on a rigid part of the projector frame (not shown). Its position is preferably adjusted by a connecting rod 41, operatively connected to the usual framing lever 42, which lever is common to most types of motion picture projectors. By this cooperative arrangement of the framing device and reproducer time-changing mechanism, there is automatically effected a time compensation in the sound reproduction to accompany every framing change. There being in standard film 16 frames or separate photographic images to the foot and with a speed of projection of one foot of film per second, each frame will correspond to a time lapse of one-sixteenth of a second. It not infrequently happens under actual operating conditions that a film will get out of frame in the projector. This may be due to a number of causes perhaps the most common of which is defective frame matching when the film is spliced. When for this reason it becomes necessary to change the framing of the film, i. e. to cause to register with the projection aperture a frame above or below the area being projected, the corresponding portion of the sound record will be moved automatically into the reproducing aperture. It is to be borne clearly in mind, however, that this adjustment is for an entirely different purpose than the independent adjustment of the sound record, with respect to the reproducing aperture, which adjustment has been previously described. This time correction required between corresponding sound and light images, to effect their synchronous reproduction at a given projection range, will be hereinafter referred to as the "range bias". The range bias however should be effected without regard to the framing problem above described.

The embodiment of the invention shown in Fig. 2 is applied to talking motion picture apparatus similar to that illustrated in Fig. 1. The sound and pictorial records are both carried on the same motion picture film or strip, one beside the other. In this modification the range bias is introduced by means of an adjustable coupling between a gear 50 on the intermittent sprocket pinwheel shaft 52 and the continuous feed sprocket gear 51. The adjustable coupling comprises a spiral gear or high pitch worm 53 mounted on a shaft 54, said gear engaging gear 50 by which it is rotated. On the upper end of shaft 54 is slidably splined an elongated spiral gear 55 engaging the continuous feed sprocket gear 51. Spiral gear 55 is prevented from moving longitudinally by the gear fork 56 which is adjustably positioned by hand wheel screw 57 mounted in a member 58, which is in turn rigid with the projector frame. As is well understood, a longitudinal adjustment of spiral gear 55 along its axis of rotation will rotate gear 51, with which it is meshed, independently of the driving rotation of shaft 54. Such an auxiliary rotating device is used in a number of different devices now on the market. In the present embodiment the upper continuous feed sprocket 6 of the motion picture projector also serves to draw the film through the reproducer gate 15. By rotatably adjusting said sprocket independently of the rotation of the intermittent picture feed sprocket 5, it is plain that any desired degree of range bias may be introduced between the picture and its corresponding sound.

The principle underlying the present invention may be applied to advantage in the recording of sound records to be used in connection with talking motion pictures. It will be apparent that the principle of providing an adjustable loop of film between the sound and picture recording devices will perform a function analogous to that in connection with the projection and reproducing mechanism hereinbefore described. The adjustable loop between the sound and picture recording apertures will give rise to a relative mechanical displacement of the corresponding sound and pictorial images, which, when the film and record are simultaneously projected and reproduced in a talking motion picture device, will result in a time displacement between the projected pictorial images and the corresponding sound. Thus, there is afforded at the time of making the pictorial and sound record, an opportunity to introduce a time bias appropriate to average operating conditions. In addition to this there is also afforded a means for correcting the time error that must otherwise occur in the simultaneous recording and photographing of a given event at a distance from the recording device due to the discrepancy in the velocity of sound and light. Thus, if an event at a distance of 100 feet from the recording means be photographed and its sound recorded simultaneously, there will be found upon projection and reproduction of the film and record a time error of the order of one-tenth of a second. This error can be totally eliminated in the making of the talking motion picture by applying a corresponding time correction or time bias, as we term it, between the picture and sound record. By this means composite talking picture records may all be reduced to a common time bias standard regardless of the distance of the record event from the recording apparatus, this resulting in a uniformly satisfactory illusion of the natural association of visual and audible impressions.

The inventor has found that the nature of the subject which is being recorded somewhat affects the time bias required for a perfect illusion as do also the characteristics of the lens with which the subject is photographed. These facts, however, are based largely upon psychological effects and at the present time must be empirically determined. The present invention, however, affords a means whereby their influence may be taken into account when establishing the time bias under any given circumstances, and makes possible a compensation for these factors, which may otherwise impair the illusion.

It is to be understood that the invention is not limited to the embodiments and modifications described in the foregoing, but is susceptible of various other adaptations and applications within the scope of the following claims.

What I claim is:

1. A sound motion picture device including a composite motion picture strip carrying both pictorial and sound records, a motion picture projecting aperture, a stationary sound reproducer controlling aperture cooperating with said sound record, and mechanical means adapted to alter the position of the said sound record relative to said sound reproducer controlling aperture without altering the relationship between the pictorial record and the said picture projecting aperture.

2. In a sound motion picture reproducing and projection machine, the combination with a sound reproducing mechanism and a picture projection mechanism, and a continuous photographic sound and picture film, of an adjustable loop formed between said sound reproducing mechanism and said picture projection mechanism substantially as and for the purpose described, and means for adjustably varying the size of the loop.

3. A sound motion picture device including a compositive motion picture strip carrying both pictorial and sound records, a motion picture projecting aperture, a stationary sound reproducer controlling aperture cooperating with said sound record, mechanical means adapted to alter the position of the said sound record relative to said sound reproducer controlling aperture without altering the relationship between the pictorial record and the said picture projecting aperture, and adjusting means adapted to simultaneously alter the position of the sound record relative to the sound reproducer and the pictorial record with respect to the picture projecting aperture, the said mechanical means being so mounted as to partake of the motion of the said adjusting means when the latter is operated, and also being movable independently thereof for the purpose specified.

4. A sound motion picture device including a picture aperture, a stationary sound image aperture, means for feeding a motion picture strip past said picture and sound apertures, and mechanical means adapted to alter the position of the said strip relative to said sound image aperture without altering the relationship between the said strip and the said picture aperture.

5. In a sound motion picture device including a picture image aperture, a sound image aperture, means for feeding a motion picture strip past said picture and sound apertures, mechanical means adapted to alter the relative position of the said strip and said sound image aperture without altering the relationship between said strip and said picture image aperture, and adjusting means adapted to simultaneously alter the relationship between both said picture and sound image apertures and said strip, the said mechanical means being operatively connected to said adjusting means whereby to permit of the simultaneous or selective control of the relationships between the said composite strip and the said picture image and sound image apertures respectively.

In witness whereof, I have hereunto signed my name.

BRYAN M. BATTEY.